United States Patent [19]

Ackert

[11] 4,236,623

[45] Dec. 2, 1980

[54] ESCALATOR SAFETY DEVICE

[76] Inventor: Duane B. Ackert, 25100 Meadowbrook, Novi, Mich. 48050

[21] Appl. No.: 968,651

[22] Filed: Dec. 11, 1978

[51] Int. Cl.[3] .......... B65G 9/12

[52] U.S. Cl. .......... 198/333; 198/325

[58] Field of Search .......... 198/324-333

[56] References Cited

U.S. PATENT DOCUMENTS 2,981,397 4/1961 Hansen .......... 198/332 X

FOREIGN PATENT DOCUMENTS 2161442 7/1972 Fed. Rep. of Germany .......... 198/333

519149 3/1940 United Kingdom .......... 198/326

*Primary Examiner*—Robert B. Reeves

*Assistant Examiner*—Douglas D. Watts

*Attorney, Agent, or Firm*—Cullen, Sloman, Cantor, Grauer, Scott & Rutherford

[57] ABSTRACT

An escalator step plate is provided at each edge with a narrow ramp which slopes upwardly and laterally outwardly to divert wearing apparel or other objects from the gap between the moving step plates and the stationary escalator skirt members and to lift shoes off the lateral edges of the step plate to prevent a tendency of a rider's shoe which has gotten hot from friction with the skirt member from sticking to the metal step plate. The ramp is preferably formed of smooth urethane, and may be formed integrally with the step plate or as an attachment.

1 Claim, 3 Drawing Figures

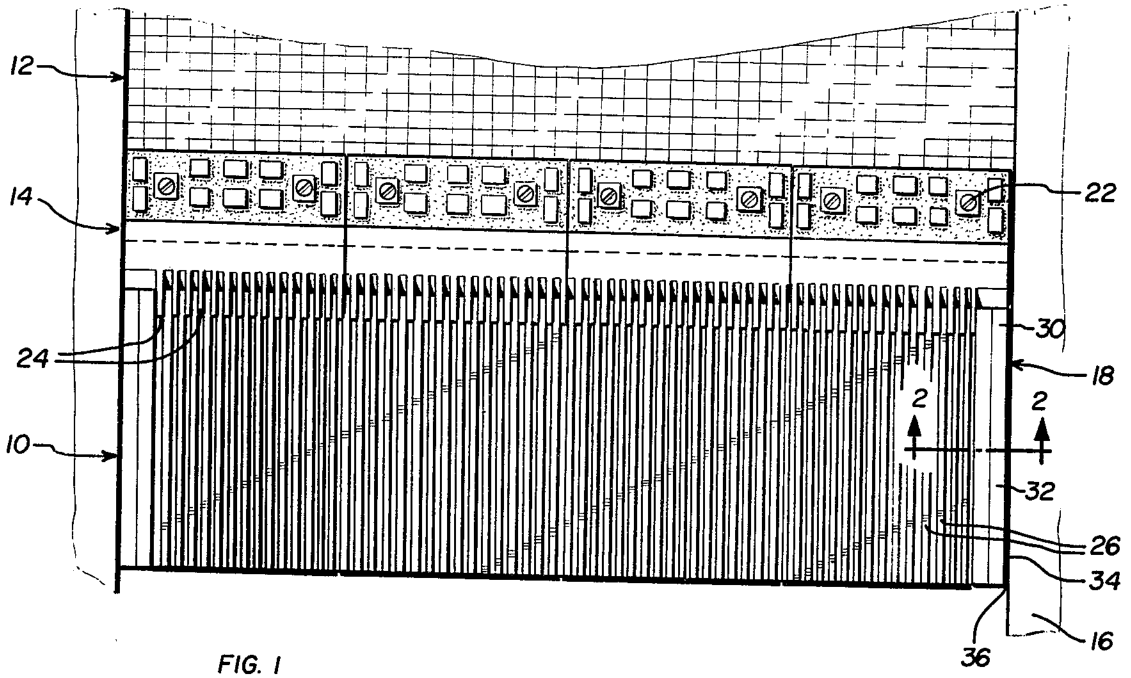
FIG. 1
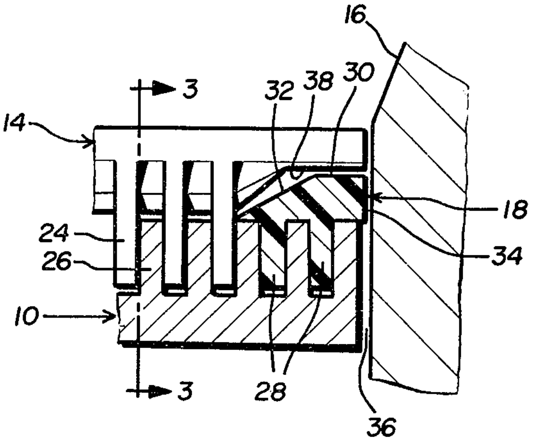
FIG. 2
FIG. 3
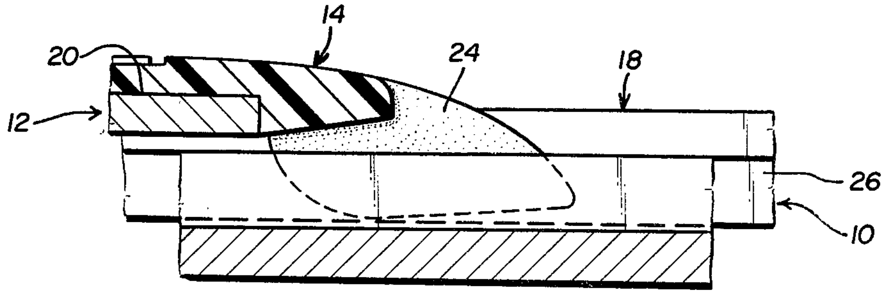

ESCALATOR SAFETY DEVICE

BACKGROUND OF THE INVENTION

A potentially hazardous condition which occasionally arises in the operation of escalators is a tendency of the rider's wearing apparel to rub against the stationary stainless steel vertical skirt member which laterally encloses the moving escalator. This friction between the moving article of clothing and the stationary skirt member causes certain materials to heat sufficiently that they soften and tend to adhere to the cast aluminum or cast iron step plate. Such adherence then tends to pull such article underneath the comb plate as the step plate disappears thereunder at the exit lével of the escalator. Articles which are particularly vulnerable to this tendency include tennis shoes, over-shoes, clothing of a small child sitting on the escalator or long gowns. A very high proportion of the accidents which occur on a properly maintained escalator involve an article that is either wedged between the skirt and the step plate or between the step plate and the comb plate.

A prior art attempt to alleviate this condition has been made on escalator step plates manufactured by the Hitachi Company of Japan. As is conventional, such step plates have a series of closely spaced parallel grooves extending longitudinally along their upper surface, which grooves intermesh with the downwardly projecting fingers of the comb plate to aid in preventing articles from wedging in under the comb plate or floor plate. In the Hitachi step plate, the extreme lateral edges of each step plate have a raised shoulder which rises perpendicularly from the upper surface of the step plate. This configuration, which is formed integrally with the step plate, has not been entirely successful in avoiding the above-described problems. For example, it will not always guide an article away from the gap between the step plate and the skirt member; being formed integrally with the cast aluminum or cast iron step plate, it is subject to adherence by a soft semi-melted plastic article; it does not lend itself to permitting reduction in the width of the above described gap; it provides no solution for the numerous escalators which are already installed and operating.

Accordingly, it is the primary object of the present invention to provide an improved means for avoiding or reducing the potentially hazardous conditions described above.

SUMMARY OF THE INVENTION

This invention involves the contouring of the upper outer surface of the escalator step plate so as to provide an inclined ramp formed of a smooth material having a low coefficient of friction not susceptible to adherence to hot sticky articles. This inclined guide strip can be formed integrally with the step plate or as a separate attachment which can be retrofitted to existing escalator step plates.

BRIEF DESCRIPTION OF THE DRAWINGS

FIG. 1 is an escalator step plate shown partially extending beneath the comb plate and the landing plate, these elements being shown fragmentarily.

FIG. 2 is a cross-sectional elevation viewed in the direction of arrows 2—2 of FIG. 1.

FIG. 3 is a cross-sectional elevation viewed in the direction of arrows 3—3 of FIG. 2.

DETAILED DESCRIPTION OF THE INVENTION

Referring to the drawings, the environment of the present invention generally comprises an escalator step plate 10 which cooperates with landing plate 12, comb plate 14 and vertical skirt members 16 in the conventional manner. The novel step plate guide strip of the present invention is shown at 18.

In the drawings, step plate 10 is shown at the point at which it is emerging from or disappearing under the stationary landing plate 12 at the level of the entrance or exit end of the escalator. Landing plate 12 is provided with a recess 20 to which comb plate 14 is secured by screws 22. Comb plate 14 is provided with a plurality of closely spaced teeth 24 which are spaced and dimensioned to be received within the grooves between the parallel upstanding ribs 26 of the moving step plates. With the exception of step plate guide strips 18, all of the structure described above is essentially conventional.

Guide strip 18, best shown in FIG. 2, is provided with a pair of downwardly projecting longitudinal ribs 28 which are dimensioned to be snugly received within the grooves between upstanding ribs 26 of the step plate. Guide strip 18 extends the full longitudinal length of the step plate, one such guide strip being located at each of the two opposite lateral edges of the top surface of each step plate. The guide strip perferably has a flat portion 30 adjacent the extreme upper outer edge of the top surface, and a bevel or ramp portion 32 which slopes upwardly and laterally outwardly from the extreme inner edge of the guide strip to the upper flat surface 30 thereof.

Preferably, guide strip 18 is dimensioned so that the outer side wall of the guide strip will more closely approach skirt 16 than does the outer side wall of step plate 10, so as to minimize gap 36. As best shown in FIG. 2, an undercut 38 is provided at the outer edge of comb plate 14, to provide clearance for guide strip 18 as it passes under the comb plate.

Guide strip 18 is fabricated of a material which is relatively smooth and slippery for minimum friction. The material should also have a minimum tendency to adhere to soft, hot and sticky articles which have become heated and softened by friction with the stationary skirt members. It is also preferable that such material be somewhat brittle so that it will readily break in the event of a jam, so as to minimize injury. One material which has been found to possess the desired physical properties is urethane.

In operation, the inclined ramp portion 32 of guide strip 18 functions to guide articles which are close to the extreme outer edge of the step plate away from such edge, away from gap 36 and away from stationary skirt member 16. The low coefficient of friction of the guide strip material and the slope or incline of its upper contour creates a tendency for such articles to slide downwardly away from the area of danger.

In the illustrated embodiment of this invention, guide strip 18 is formed as a separate attachment, enabling it to be retrofitted to existing escalator step plates. An advantage of forming the guide strip as a separate attachment is that its dimensional tolerances can be closely controlled so that it can be dimensioned to more closely approach skirt 16. In fact, the softness of the material enables it to be filed readily at the time of installation so that its width can be initially dimensioned to provide an absolute minimum of gap, which can then be increased by filing at the time of installation, if necessary, to assure adequate running clearance with the skirt member. Furthermore, the softness of the material prevents any scratching of the skirt.

Guide strips 18 are preferably secured to step plates 10 by an adhesive, although recessed screws may also be utilized.

It is preferable that the guide strip be formed of a brightly colored material to act as a visual warning that the edges of the step plate are potentially dangerous areas. A separate rather than integral guide strip facilitates this differential coloration between the dangerous end zones and the safe central zones of the step plate.

The step plate guide strip 18 of the present invention has been illustrated as having a narrow flat portion 30 on top. This construction is preferred so as to give better vertical clearance at the landing plate and comb. However, it is not essential to the concept of the present invention, the essential feature being the provision of at least a significant portion of the guide strip having the inclined ramp portion 32. A preferred height of the guide strip above the step plate is about one quarter of an inch. This height will lift a shoe, for example, off the metal step plate and prevent any adherance which might otherwise occur.

This invention may be further developed within the scope of the following claims. Accordingly, the above specification is to be interpreted as illustrative of only a single operative embodiment of the present invention, rather than in a strictly limited sense.

I now claim:

1. In escalator construction of the type characterized by step plates adapted to move longitudinally between a pair of stationary longitudinally extending skirt members which function as vertical barriers along the two lateral sides of the escalator, a small clearance gap being provided between each lateral edge of the step plates and the associated skirt member, each of the step plates being provided with a plurality of parallel closely spaced longitudinally extending grooves in its upper surface, the improvement which comprises:

a pair of step plate guide strips adapted to be applied to the upper surface of each step plate at its opposite lateral edges, each guide strip beingdimensioned to extend substantially the full longitudinal length of the step plate and to extend inwardly from the lateral edge of the step plate a sufficient width to overlap a plurality of the grooves, the under side of said guide strips having a plurality of longitudinally extending downwardly projecting ribs dimensioned to fit into said grooves between upstanding ribs of the step plate to aid in locating and stabilizing said guide strip on the step plate, means for securing said guide strip to said step plate, said guide strips projecting upwardly from the top surface of the step plate with the upper surface of each of said guide strips being contoured to slope upwardly at a shallow angle from the horizontal and the laterally inward edge toward the laterally outward edge to form a ramp-like face for at least a substantial part of the lateral width of said strip, wherein the guide strip width is dimensioned so that the clearance gap between the lateral outward edge of the guide strip and the skirt is less than that between the lateral edge of the step plate and the skirt, said strips being fabricated of a plastic material having a low coefficient of friction and a very smooth upper surface to which sticky semi-melted plastic materials will not readily adhere.

* * * * *